(12) United States Patent
Turner

(10) Patent No.: US 6,450,521 B1
(45) Date of Patent: Sep. 17, 2002

(54) SUSPENSION SYSTEM FOR A VEHICLE

(75) Inventor: Paul H. Turner, Boulder, CO (US)

(73) Assignee: Maverick American LLC, Boulder, CO (US)

( * ) Notice: Subject to any disclaimer, the term of this patent is extended or adjusted under 35 U.S.C. 154(b) by 0 days.

(21) Appl. No.: 09/502,746

(22) Filed: Feb. 11, 2000

(51) Int. Cl.$^7$ .............................................. B62K 25/28
(52) U.S. Cl. ..................................... 280/284; 280/275
(58) Field of Search ................................ 280/284, 275, 280/283, 288, 281.1; 180/227

(56) References Cited

U.S. PATENT DOCUMENTS

| | | | |
|---|---|---|---|
| 439,095 A | 10/1890 | Becker | |
| 1,047,430 A | 12/1912 | Michaelson | |
| 5,306,036 A | * 4/1994 | Busby | 280/284 |
| 5,320,375 A | 6/1994 | Reeves et al. | 280/284 |
| 5,356,165 A | 10/1994 | Kulhawik et al. | 280/275 |
| 5,385,361 A | 1/1995 | De Bei | 280/284 |
| 5,452,910 A | 9/1995 | Harris | 280/284 |
| 5,460,396 A | * 10/1995 | Sutter et al. | 280/284 |
| 5,474,318 A | 12/1995 | Castellano | 280/284 |
| 5,671,936 A | * 9/1997 | Turner | 280/284 |
| 5,685,553 A | 11/1997 | Wilcox et al. | |
| 5,725,227 A | 3/1998 | Mayer | 280/284 |
| 5,791,674 A | 8/1998 | D'Aluisio et al. | 280/284 |
| 5,899,480 A | * 5/1999 | Leitner | 280/261 |
| 5,921,572 A | 7/1999 | Bard et al. | 280/284 |
| D412,868 S | 8/1999 | Klein et al. | |
| 5,957,473 A | 9/1999 | Lawwill | 280/284 |
| 6,056,307 A | 5/2000 | Busby et al. | 280/284 |
| 6,073,950 A | 6/2000 | Busby | 280/284 |
| 6,099,010 A | 8/2000 | Busby | |
| 6,109,636 A | 8/2000 | Klein et al. | |
| 6,131,934 A | * 10/2000 | Sinclair | 280/284 |
| 6,164,676 A | 12/2000 | Wilcox | |
| 6,203,042 B1 | 3/2001 | Wilcox | |

FOREIGN PATENT DOCUMENTS

WO    WO 99/65760    12/1999

* cited by examiner

Primary Examiner—Anne Marie Boehler
(74) Attorney, Agent, or Firm—Townsend and Townsend and Crew LLP

(57) ABSTRACT

A suspension system for a rear wheel of a multi-wheel vehicle comprises a front structural member that is adapted to be coupled to seat and a front fork. The front structural member has a first pivot point and a second pivot point that is vertically above the first pivot point. A rear structural member is adapted to be operably coupled to an axle of a rear wheel. The rear structural member has a third pivot point that is rearward of the first pivot point. A slideable connector is rigidly coupled to the rear structural member and pivotally coupled to the second pivot point. A link member is pivotally linked to the first pivot point of the front structural member and the third pivot point of the rear structural member.

24 Claims, 4 Drawing Sheets

SUSPENSION SYSTEM FOR A VEHICLE

BACKGROUND OF THE INVENTION

This invention relates generally to the field of suspension systems, and in particular to suspension systems for wheeled vehicles, such as bicycles. More specifically, the invention provides suspension systems that are useful in connection with the rear wheel of a multi-wheel vehicle, such as with the rear wheel of a bicycle.

Suspension systems are widely used in a variety of vehicles. Many of these suspension systems are progressively becoming more elaborate. For example, one trend is to increase the sophistication of both rear wheel and front wheel bicycle suspension systems.

When designing a vehicle suspension system, a variety of parameters should be taken into account. Such parameters can include, for example, bump compliance, chassis roll control from braking or accelerating, unnecessary suspension movement caused by torque in the drive chain, frame weight, complexity, rigidity, and the like.

For example, when the rear wheel of a vehicle encounters a bump, a force that is directed upward and rearward on the wheel is produced. Therefore, a suspension design that permits the wheel to move upward and rearward is best at mitigating the bump impact. As another example, the chassis may tend to roll while braking or accelerating due to the rider's center of mass being located high on the vehicle. As such, when the brakes are applied, the rider's mass tends to continue forward and "roll" or "tip" over the chassis. The opposite occurs while accelerating. Hence, during acceleration, the wheels tend to drive out from under the rider, causing the chassis to tip backward. This tendency is exaggerated when climbing a steep hill. Hence, the force created when braking or accelerating tends to place more weight on one of the wheels and "lightens" the other wheel.

To compensate for such effects, a variety of suspension systems have been developed. Although many variations exist, most systems generally fall into three main categories. These categories may be based on the method of wheel articulation. The variations within each category usually focus on how a shock absorber is mounted and activated. Some systems have a simple strut-type mounting, while others employ complex linkages to gain a more progressive shock movement, or locate the shock to a more convenient location on the frame. However, for most systems, shock mounting and activation has little to do with the basic performance of the system.

The first general category is a pivotless design. With such a design, a shock is mounted between the seat stays and the seat tube, and wheel movement is achieved by simply allowing the chain stays to flex. Since the stays flex rather than rotate on a pivot, the amount of possible travel is limited. The chain stays are usually mounted low on the frame at the bottom bracket (pedal spindle) such that the wheel path is moving forward as it travels upward. Although the pivotless design may be constructed to be relatively lightweight and maintenance free, the design has limited travel and a poor wheel trajectory.

The second general category is a single pivot design. This design is similar to how many motorcycles are currently constructed. With such a design, a rear triangle or swing arm member connects the wheel to the frame. The swing arm swings on a single pivot point. The location of the pivot varies widely from one design to another and has a significant effect on how the system operates. Essentially, the location of the pivot point is a function of compromises. Locating the pivot close to the bottom bracket permits easy frame construction and minimal increase in chain length as the wheel moves through its travel. However, the wheel trajectory is poor. Raising the pivot higher on the frame improves trajectory, but the chain length problem worsens and the frame's structural integrity is compromised, especially if the pivot is also moved forward to achieve a long swing arm (the distance between the wheel and the pivot). A longer swing arm has a more constant trajectory direction, whereas a short swing arm tends to cause dramatic changes to the pro- and anti-squat effects as the wheel moves through its travel.

A variation of the single pivot design is to incorporate the bottom bracket (pedal spindle) into the swing arm. This is commonly referred to as a unified rear triangle (URT). This variation alleviates the chain length problems, but when the pivot is located forward and up on the frame, the rider's weight on the swing arm begins to interfere with the suspension characteristics. Hence, such designs typically have poor chassis roll control, which may only be reduced by compromising other features.

The third general category is a four-bar link. Such systems are described in, for example, U.S. Pat. Nos. 5,452,910 and 5,791,674, the complete disclosures of which are herein incorporated by reference. In general, a four bar link system essentially locates the wheel on one leg of a parallelogram. This provides the wheel with a more linear trajectory and may be configured to achieve rearward movement. However, the chain length problem occurs if this is taken too far. Further, mounting a shock to such systems is often a difficult task, and only adds more pivots to an already complicated design. Hence, such systems are often heavy, require significant maintenance, and experience a large degree of frame flex.

Hence, the invention relates to a new type of suspension that takes into consideration various operating parameters and riding conditions. In this way, the features of the invention are useful in mitigating bump impact while also providing chassis roll control and permitting excellent climbing abilities, ease of construction, and low maintenance, among other features.

SUMMARY OF THE INVENTION

In one embodiment, a suspension system is provided for a rear wheel of a multi-wheel vehicle. The system comprises a front structural member to which may be operably coupled to a seat and a front fork. The front structural member has a first pivot point and a second pivot point that is vertically above the first pivot point. The suspension system further includes a rear structural member that may be operably coupled to an axle of a rear wheel. The rear structural member has a third pivot point that is rearward of the first pivot point of the front structural member. A slideable connector is rigidly coupled to the rear structural member and pivotally coupled to the second pivot member of the front structural member. A structural link is pivotally linked to the first pivot point of the front structural member and the third pivot point of the rear structural member.

In one particular aspect, the first, second and third pivot points are arranged such that the axle of the rear wheel moves in a nearly straight line that is angled about 15 degrees to about 20 degrees in a clockwise direction with respect to a vertical line passing through the axle. In this way, when the rear wheel encounters a bump, the rear wheel is permitted to move upward and rearward in a nearly straight line to mitigate the impact of the bump. Similarly, movement of the axle of the rear wheel along such a line reduces the amount of chassis roll caused from breaking or accelerating. The relatively simple design of the suspension system also permits the overall frame of the vehicle to be constructed in a rigid, low cost and relatively lightweight manner.

In another particular aspect, the front structural member includes a front fork steering tube, a down tube, a back tube, and a seat tube mount that is coupled to the back tube. The first pivot point is located vertically below the seat tube mount and rearward of the front fork steering tube. Further, the second pivot point is located between the first pivot point and the seat tube mount. Conveniently, the second pivot point may be located on the back tube. In another aspect, the third pivot point may be located vertically below the slideable connector and forward of the axle of the rear wheel.

In still another aspect, the slideable connector comprises a shock absorber having an outer tube that is rigidly coupled to the rear structural member. The slideable connector further includes an inner tube that is slideable within the outer tube and that is pivotally coupled to the second pivot point.

The suspension system may be used in a wide variety of multi-wheel vehicles including motorcycles, mopeds, bicycles, automobiles and the like. When used with a bicycle, the suspension system may also include a pedal spindle for turning a chain to in turn rotate the rear wheel. Conveniently, the pedal spindle may be mounted on the link member, on the front structural member, or on the rear structural member.

DESCRIPTION OF THE SPECIFIC EMBODIMENTS

Figure 1:
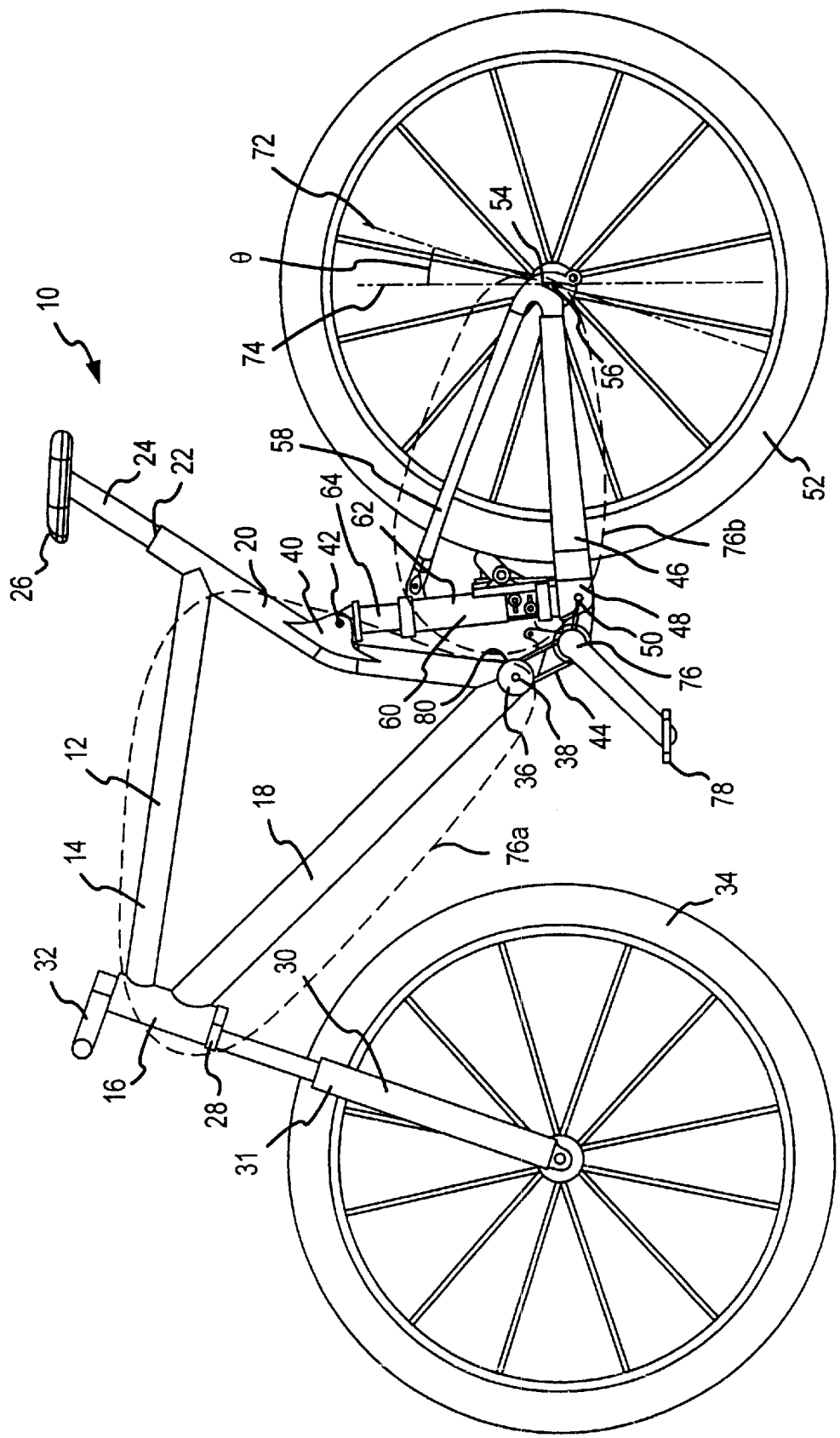
FIG. 1 is a left side view of one embodiment of a bicycle having a suspension system according to the invention.

The invention provides suspension systems that may find particular use with a rear wheel of a multi-wheel vehicle. Although the suspension systems will find their greatest use with bicycles, the suspension systems may also be utilized with other multi-wheel vehicles including motorcycles, mopeds, ATV's, automobiles, and the like.

The suspension systems of the invention help to maintain the rider at a generally constant distance from the ground when experiencing a variety of riding conditions, such as when accelerating, braking, encountering bumps or rough terrain, and the like. The suspension systems also provide the vehicle with excellent climbability by helping to maintain the rear wheel pressed against the ground when climbing.

Another feature of the suspension systems of the invention is that they permit the axle of the rear wheel to move in a nearly straight line that is angled at about 15 degrees to about 20 degrees in a clockwise direction with respect to a vertical line passing through the axle of the rear wheel. Movement of the rear axle in this manner permits the rider to remain generally level when experiencing bumps by permitting the rear wheel to move upwardly and rearwardly at approximately the same angle through which the force vector is directed. Further, by permitting the rear axle to move in a straight path, rather than in a tight arc, the rider may remain generally level when accelerating and braking. For example, when accelerating, such movement of the axle of the rear wheel produces an "anti-squat" force to compensate for the tendency of the suspension to compress. More specifically, by permitting the wheel to move rearward as well as upward in a constant line, the rear wheel will want to "drive under" the chassis under acceleration and will attempt to extend the suspension, thus producing the "anti-squat" force. This will then counter the compressive forces produced during acceleration. Conversely, when braking, such movement of the axle of the rear wheel will cause the rear wheel to "pull away" from the chassis creating a compressive or pro squat force in the suspension. Such a force will then tend to counter the forward chassis roll during braking.

Movement of the axle of the rear wheel in such a manner may be accomplished by constructing the suspension system of a front structural member and a rear structural member that are coupled together by a link member that is pivotally linked to both the front structural member and the rear structural member. The suspension system further includes a slideable connector that is rigidly coupled to the rear structural member and pivotally coupled to the front structural member at a point that is vertically above the connection between the frontal structural member and the link. The suspension system may utilize essentially any type of slideable connector and may optionally employ the use of a shock absorber that may compress or expand depending on movement of the suspension system. With such a configuration, as the rider sits on the seat of the vehicle, the suspension system will ideally move to an equilibrium position determined by the rider's weight. As the rider begins to ride the bicycle, the point at which the rear axle is attached to the rear structural member will move in a nearly straight line that is angled at about 15 degrees to about 20 degrees in a clockwise direction (from a left side view of the bicycle) with respect to a vertical line passing through the axle. In other words, the rear axle may move upward and rearward at about 15 degrees to about 20 degrees with respect to vertical, or downward and forward at about 15 degrees to about 20 degrees with respect to vertical. The rear axle of the wheel may move vertically above or below the equilibrium position depending on the particular set of riding conditions, such as when encountering bumps or rough terrain, when accelerating, braking or the like. Typically, the axle of the rear wheel will be able to move approximately 1 inch to about 8 inches relative to the equilibrium position while the seat of the vehicle remains generally stationary.

One particular advantage of the suspension system of the invention is its relatively simple design. In this way, a bicycle frame may be constructed in a relatively inexpensive manner. Further, by utilizing minimal parts, the resulting vehicle may be constructed to be relatively lightweight. The simple design also reduces the amount of required maintenance. Further, the simple design permits the pedal spindle to be mounted at a variety of locations to minimize problems resulting from chain flexing.

Figure 2:
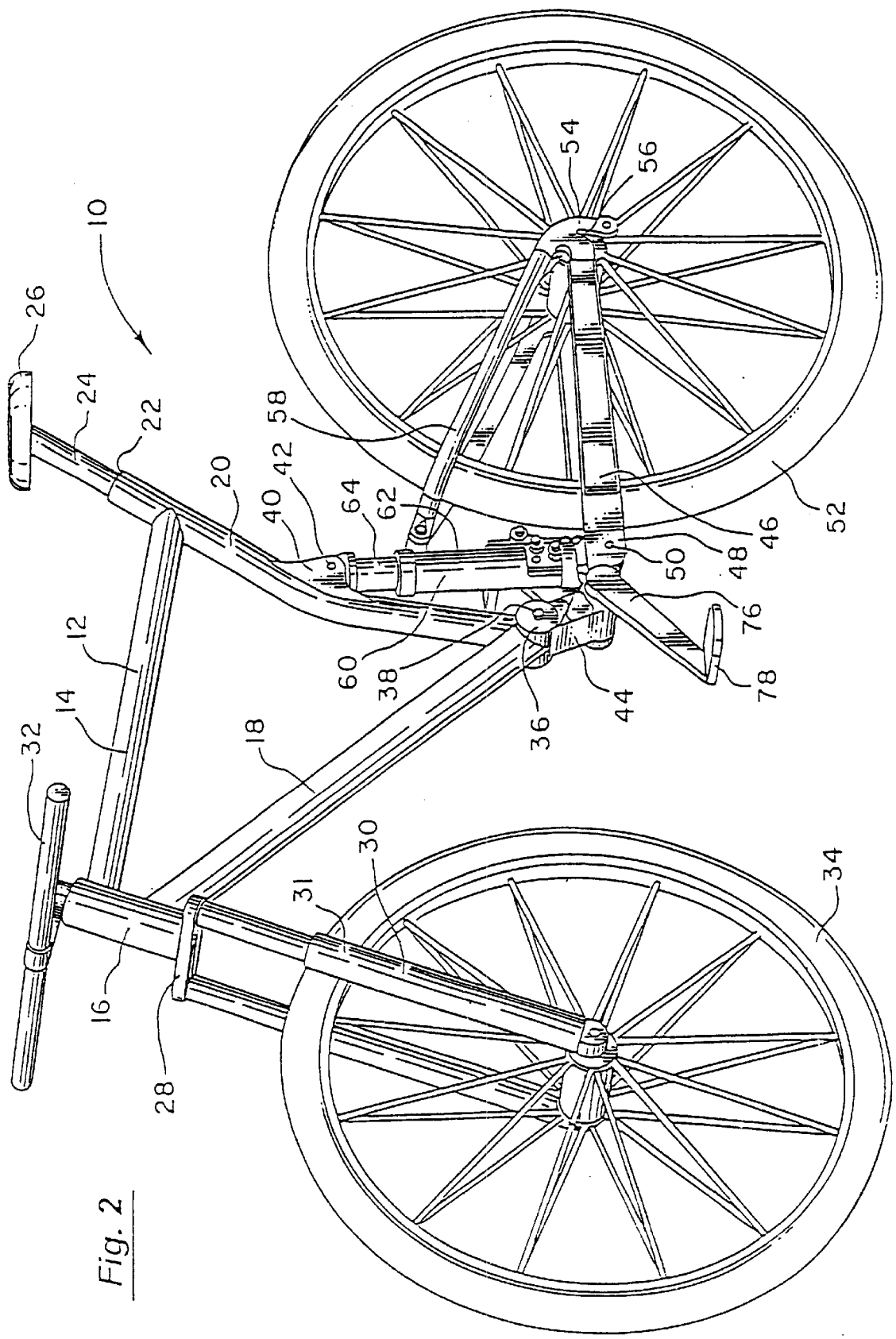
FIG. 2 is a front perspective view of the bicycle of FIG. 1.
Figure 3:
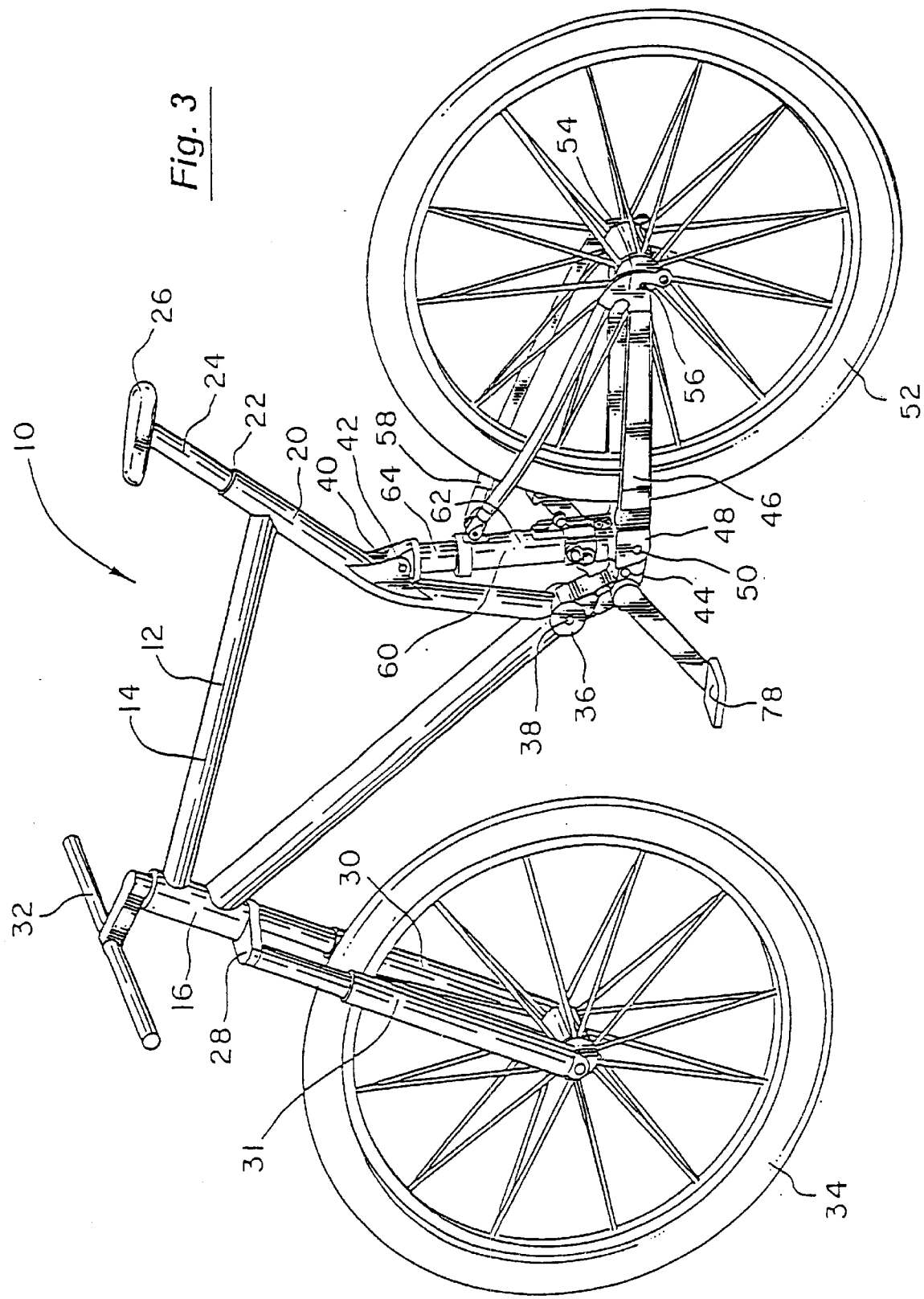
FIG. 3 is a rear perspective view of the bicycle of FIG. 1.

Referring now to FIGS. 1 through 3, one embodiment of a bicycle 10 will be described, it being appreciated that the suspension system described in connection with bicycle 10 may be used with other multi-wheel vehicles as previously described. Bicycle 10 comprises a frame 12 that is constructed of a top tube 14, a front fork steering tube 16, a down tube 18 and a back tube 20. Coupled to back tube 20 is a seat mount 22. A seat tube 24 having a seat 26 is slideable through mount 22 and into back tube 20 as is known in the art. Although shown with a particular configuration, it will be appreciated that frame 12 may be constructed to have a wide variety of configurations and may utilize the same or different elements as just described. Hence, the invention is not intended to be limited to the specific configuration of frame 12 as shown in FIG. 1.

Coupled to steering tube 16 is a mount 28 for mounting a front fork assembly 30 to frame 12. Front fork assembly 30 includes a handle bar 32 for turning a front wheel 34 that is coupled to front fork assembly 30 as is known in the art. Front fork assembly 30 may optionally include front shock absorbers 31 such as those commercially available from a variety of suppliers, including Rockshox, Inc.

Frame 12 further includes a pivot bracket 36 having a pivot point 38 and another pivot bracket 40 having a pivot point 42. Pivot bracket 40 is configured to be vertically above pivot bracket 36 and vertically below seat mount 22.

Figure 4:
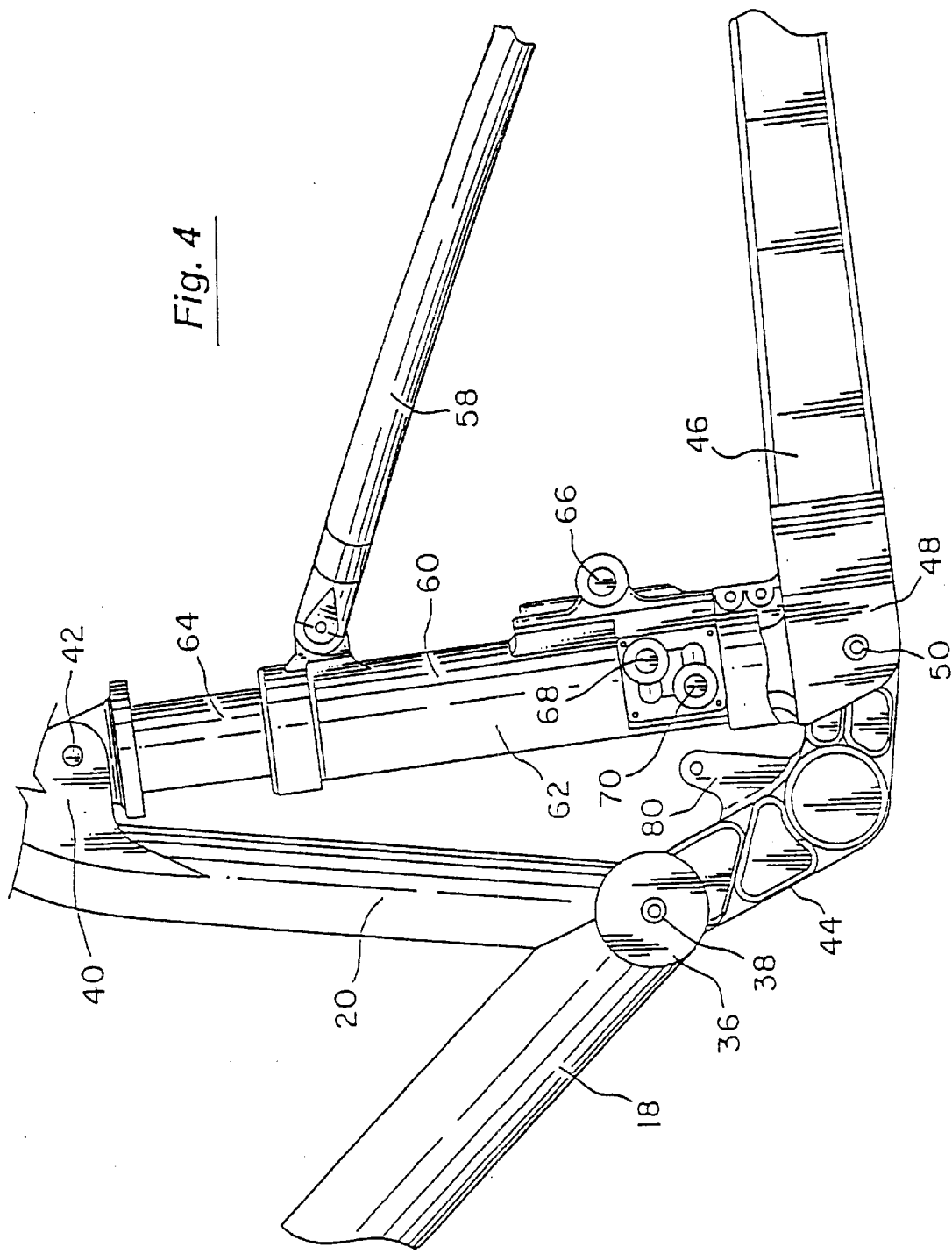
FIG. 4 is a more detailed view of the suspension system of the bicycle of FIG. 1.

A link member 44 is pivotally coupled to pivot bracket 36 so as to pivot about pivot point 38. Such a pivotal connection is illustrated in greater detail in FIG. 4. Link member 44 is also pivotally coupled to an arm 46 that has a pivot bracket 48 with a pivot point 50. Link member 44 is pivotally linked to pivot bracket 48 so as to be pivotal about pivot point 50. In this way, link member 44 may pivot relative to both frame 12 and arm 46.

Coupled to arm 46 is a rear wheel 52. Conveniently, arm 46 includes a mount 54 to permit an axle 56 of rear wheel 52 to be mounted to arm 46. Optionally, an extension member 58 may be included to provide additional structural support. As shown, arm 46 and extension member 58 form a structure that is similar to a conventional rear triangle. However, it will be appreciated that the invention is not intended to be limited to a specific structural configuration of arm 46 or to the use of extension member 58.

Coupled between arm 46 and frame 12 is a slideable connector 60. As shown, connector 60 is in the form of a shock absorber. However, it will be appreciated that any type of slideable connector may be employed and may optionally include shock absorbing capabilities. Connector 60 comprises an outer tube 62 that is rigidly mounted to arm 46. An inner tube 64 is slideable within outer tube 62. Inner tube 64 is pivotally coupled to pivot bracket 40 so as to pivot about pivot point 42. If extension member 58 is employed, it may be rigidly connected to outer tube 62. Optionally, slideable connector 60 may include various adjustment knobs 66, 68 and 70 to alter the shock absorbing capabilities of slideable connector 60.

The particular arrangement of pivot points 38, 42 and 50 in combination with link member 44 and slideable connector 60 form a rear suspension system for rear wheel 52. When a rider is sitting on seat 26 and bicycle 10 is rolling over a surface, the suspension system of bicycle 10 is configured to move axle 56 of rear wheel 52 along a nearly straight path as identified by reference line 72. The angle between reference line 72 and a vertical reference line 74 is defined as angle θ. The arrangement of pivot points 38, 42 and 50 is also selected such that the angle θ will be in the range from about 15 degrees to about 20 degrees during operation of the suspension system.

The suspension system of bicycle 10 assists in maintaining seat 26 generally level with respect to the ground when bicycle 10 experiences different riding conditions. For example, when bicycle 10 is accelerated, the rider's mass produces forces which tend to compress connector 60, causing the chassis to roll backward. The suspension system of bicycle 10 counteracts this effect with an anti-squat force that is produced by moving rear axle 56 forward and downward along line 72. Such movement tends to extend slideable connector 60 to counter the compressive forces. Conversely, when braking, the chassis will tend to roll forward. The suspension system of bicycle 10 counters this by moving rear axle 56 upward and rearward along line 72 to compress slideable connector 60.

As another example, when riding on rough or bumpy terrain, forces created by a bump will tend to force rear wheel 52 backward and upward. The configuration of the suspension system permits rear axle 52 to move backward and upward along line 72 so that rear wheel 52 may encounter the bump without transferring the force to seat 26.

The configuration of the suspension system of FIG. 1 is therefore advantageous in that it allows for smooth riding over a variety of surfaces. At the same time, the suspension system of bicycle 10 is particularly well suited for providing adequate traction of the rear wheel when climbing steep surfaces. As previously described, under certain conditions (such as when climbing a hill) connector 60 will want to compress and cause the chassis to roll backward. By providing the suspension system, this tendency is overcome so that the rider's position may remain generally constant when riding under a variety of conditions. Further, if any bumps are experienced, the suspension system is configured to counter these effects as previously described.

Another feature of bicycle suspension system of bicycle 10 is its relatively simple construction. As such, bicycle 10 may be constructed in a relatively inexpensive manner. Further, the simple design reduces maintenance of the bicycle. Another advantage of the simple design is that a pedal spindle 76 having pedals 78 may be coupled to bicycle 10 at a variety of locations. As shown in FIGS. 1–3, pedal spindle 76 is coupled to link member 44. Because a pivotal connection is provided between bracket link 44 and arm 46, chain length problems are significantly reduced. Alternatively, pedal spindle 76 may be couple to arm 46 or to frame 12 as shown schematically by outlines 76a and 76b in FIG. 1. Placement of pedal spindle 76 on link member 44 may serve as a compromise between placement on the frame (where changes in the chain length may be significant), or on the swing arm (where significant pedal movement may occur as the suspension moves.)

Conveniently, a derailleur mount 80 may also be coupled to link member 44 when pedal spindle 76 is coupled to link 44. Alternatively, derailleur mount 80 may be moved to other locations depending on the location of pedal spindle 76. Although not shown, it will be appreciated that a chain will pass from pedal spindle 76 to a rear gear of rear wheel 52 as is known in the art.

Hence, the suspension systems of the invention permit a multi-wheel vehicle to travel over rough and bumpy terrain while maintaining a generally smooth ride. Further, the construction of the suspension system limits the amount of chassis roll caused from breaking or accelerating. The simplicity of the design also permits fewer components and thereby may lessen cost as well as the weight of the bicycle.

The invention has now been described in detail for purposes of clarity of understanding. However, it would be appreciated that certain changes and modifications may be practiced within the scope of the appended claims.

What is claimed is:

1. A suspension system for a rear wheel of a multi-wheel vehicle, the system comprising:

a front structural member that is adapted to be operably coupled to a front wheel, the front structural member having a first pivot point and a second pivot point that is vertically above the first pivot point;

a rear structural member which is adapted to be operably coupled to an axle of a rear wheel having a rim, the rear structural member having a third pivot point that is rearward of the first pivot point of the front structural member;

an axially slidable connector rigidly coupled to the rear structural member and pivotally coupled to the second pivot point of the front structural member, wherein the slidable connector has a longitudinal axis that is entirely positioned in front of the rim of the rear wheel; and a link member that is pivotally linked to the first pivot point of the front structural member and the third pivot point of the rear structural member.

2. A system as in claim 1, wherein the front structural member includes a front fork steering tube, a down tube, a back tube, and a seat tube mount coupled to the back tube, wherein the first pivot point is located vertically below the seat tube mount and rearward of the front fork steering tube, and wherein the second pivot point is located between the first pivot point and the seat tube mount.

3. A system as in claim 2, wherein the second pivot point is located on the back tube.

4. A system as in claim 1, wherein the third pivot point is located vertically below the slidable connector and forward of the axle of the rear wheel.

5. A system as in claim 1, wherein the slidable connector comprises a shock absorber having an outer tube rigidly coupled to the rear structural member and an inner tube that is slidable within the outer tuber and that is pivotally coupled to the second pivot point.

6. A system as in claim 1, wherein the vehicle comprises a bicycle, and further comprising a pedal spindle mounted on the link member.

7. A system as in claim 1, further comprising a pedal spindle mounted on the front structural member.

8. A system as in claim 1, further comprising a pedal spindle mounted on the rear structural member.

9. A bicycle comprising:

a front wheel;

a rear wheel having a rim;

a front fork to which a front wheel is coupled;

a front structural member having a first pivot point and a second pivot point that is vertically above the first pivot point;

a rear structural member to which the rear wheel is coupled, the rear structural member having a third pivot point that is rearward of the first pivot point of the front structural member;

a slidable connector rigidly coupled to the rear structural member and pivotally coupled to the second pivot point of the front structural member, wherein the slidable connector has a longitudinal axis that is entirely positioned in front of the rim of the rear wheel; and a link member that is pivotally linked to the first pivot point of the front structural member and the third pivot point of the rear structural member.

10. A system as in claim 9, wherein the front structural member includes a front fork steering tube, a down tube, a back tube, and a seat tube mount coupled to the back tube, wherein the first pivot point is located vertically below the seat tube mount and rearward of the front fork steering tube, and wherein the second pivot point is located between the first pivot point and the seat tube mount.

11. A system as in claim 10, wherein the second pivot point is located on the back tube.

12. A system as in claim 9, wherein the third pivot point is located vertically below the slidable connector and forward of the axle of the rear wheel.

13. A system as in claim 9, wherein the slidable connector comprises a shock absorber having an outer tube rigidly coupled to the rear structural member and an inner tube that is slidable within the outer tuber and that is pivotally coupled to the second pivot point.

14. A system as in claim 9, further comprising a pedal spindle mounted on the link member.

15. A system as in claim 9, further comprising a pedal spindle mounted on the front structural member.

16. A system as in claim 9, further comprising a pedal spindle mounted on the rear structural member.

17. A suspension system for a rear wheel of a multi-wheel vehicle, the system comprising:

a front structural member that is adapted to be operably coupled to a front wheel, the front structural member having a first pivot point and a second pivot point that is vertically above the first pivot point;

a rear structural member which is adapted to be operably coupled to an axle of a rear wheel having a rim, the rear structural member having a third pivot point that is rearward of the first pivot point of the front structural member and that is located in front of the most forward point of the rim of the rear wheel;

an axially slidable connector rigidly coupled to the rear structural member and pivotally coupled to the second pivot point of the front structural member; and a link member that is pivotally linked to the first pivot point of the front structural member and the third pivot point of the rear structural member.

18. A system as in claim 17, wherein the front structural member includes a front fork steering tube, a down tube, a back tube, and a seat tube mount coupled to the back tube, wherein the first pivot point is located vertically below the seat tube mount and rearward of the front fork steering tube, and wherein the second pivot point is located between the first pivot point and the seat tube mount.

19. A system as in claim 18, wherein the second pivot point is located on the back tube.

20. A system as in claim 17, wherein the third pivot point is located vertically below the slidable connector and forward of the axle of the rear wheel.

21. A system as in claim 17, wherein the slidable connector comprises a shock absorber having an outer tube rigidly coupled to the rear structural member and an inner tube that is slidable within the outer tuber and that is pivotally coupled to the second pivot point.

22. A system as in claim 17, wherein the vehicle comprises a bicycle, and further comprising a pedal spindle mounted on the link member.

23. A system as in claim 17, further comprising a pedal spindle mounted on the front structural member.

24. A system as in claim 17, further comprising a pedal spindle mounted on the rear structural member.

* * * * *